A. R. PRITCHARD.
FAUCET.
APPLICATION FILED APR. 30, 1908.

958,826.

Patented May 24, 1910.

WITNESSES:
Clarence W. Carroll
D Gurnee

INVENTOR:
Albert R. Pritchard

UNITED STATES PATENT OFFICE.

ALBERT R. PRITCHARD, OF ROCHESTER, NEW YORK.

FAUCET.

958,826. Specification of Letters Patent. Patented May 24, 1910.

Application filed April 30, 1908. Serial No. 430,246.

*To all whom it may concern:*

Be it known that I, ALBERT R. PRITCHARD, a citizen of the United States, and resident of Rochester, in the county of Monroe and State of New York, have invented certain new and useful Improvements in Faucets, of which the following is a specification.

This invention relates to faucets, and consists in the apparatus hereinafter described and claimed.

The object of the invention is to provide means, in a screw plug faucet, of permitting the removal of the plug for renewal of the packing or valve surface, but at the same time to prevent the separation of the plug from the remainder of the faucet.

Figure 1:
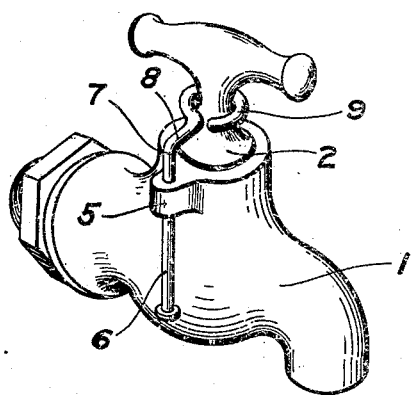
Figure 2:
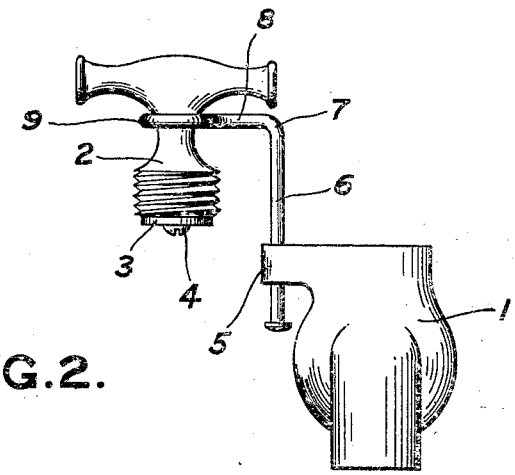

In the drawings:—Figure 1 is a perspective view of a faucet embodying this invention, showing the faucet plug in place; and Fig. 2 is a front elevation of the same faucet showing the screw plug in position for renewal or repair of the plug or of its packing.

In the drawings, 1 is the faucet body, and 2 is the screw plug thereof, which is threaded to fit in threads cut in the faucet 1, and is adapted on turning the plug to force the seat portion 3, which may be a packing held upon the plug by a screw 4, against a corresponding seat portion in the faucet itself. All the structure thus far described is well known and in common use.

Upon the faucet 1 is provided a perforated lug 5, whose perforation is parallel to the axis of movement of the screw plug 2 in its threads in the faucet. In said perforation in the lug 5 is a headed pin or rod 6, which is bent at right angles, as at 7, and is then so formed as to be fastened to the plug 2, but in such manner that the plug may revolve. In the present instance of the invention, this result is accomplished by making the end of the horizontal arm 8 into a ring 9, which passes around the stem of the plug 2. The other arm 6 slides up and down in the perforated lug 5. The length of the arm 6 is such that the plug may be wholly unscrewed from the faucet and may be lifted above the faucet so far that the plug may swing around into the position shown in Fig. 2. By this means the plug is not detachable from the faucet, but is firmly attached thereto and yet is capable of being moved into the position for repair shown in Fig. 2, or into the position for closing and opening the faucet, as shown in Fig. 1.

It is clear that the lug 5 with its perforation constitutes a guide for the connecting rod, which attaches the plug both revolubly in the operating position, and supports and permits motion of said plug out of said operating position when the plug is unscrewed from the faucet proper.

What I claim is:—

In a screw plug faucet, a faucet body with an extension cast on one side thereof, the latter having a perforation through it in line with the bore of said faucet body; a screw plug; and an angular connecting bar attached revolubly at one end to the screw plug, and movable at its other end within the perforation in said extension on the faucet body; substantially as shown and described.

ALBERT R. PRITCHARD.

Witnesses:
D. GURNEE,
L. THON.